(12) United States Patent
Lohrenz

(10) Patent No.: US 6,311,115 B2
(45) Date of Patent: Oct. 30, 2001

(54) METHOD AND SYSTEM FOR CONTROLLING A DRIVE TRAIN OF A MOTOR VEHICLE

(75) Inventor: Frank Lohrenz, Regensburg (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/752,932

(22) Filed: Jan. 2, 2001

Related U.S. Application Data

(63) Continuation of application No. PCT/DE98/01832, filed on Jul. 2, 1998.

(51) Int. Cl.⁷ .................................................. B60K 41/06
(52) U.S. Cl. .............................................. 701/57; 477/78
(58) Field of Search .................................. 701/57, 51, 54, 701/55, 56; 180/338, 197; 477/78, 135; 395/3, 900

(56) References Cited

U.S. PATENT DOCUMENTS 5,544,053    8/1996    Nakashima .

FOREIGN PATENT DOCUMENTS

| 43 25 296 A1 | 2/1995 | (DE) . |
|---|---|---|
| 196 37 210 A1 | 3/1998 | (DE) . |
| 0 532 363 A2 | 3/1992 | (EP) . |
| 0 503 948 A2 | 9/1992 | (EP) . |
| 0 531 154 A2 | 3/1993 | (EP) . |
| 0 559 255 A1 | 9/1993 | (EP) . |
| 0 622 570 B1 | 2/1997 | (EP) . |

*Primary Examiner*—Richard M. Camby
(74) *Attorney, Agent, or Firm*—Herbert L. Lerner; Laurence A. Greenberg; Werner H. Stemer

(57) ABSTRACT

A gear ratio of an automatic transmission is set by a fuzzy logic circuit which evaluates a braking torque desired by a motor vehicle driver and which carries out a change in the transmission gear ratio in order to support the braking torque of a brake system. After changing the transmission gear ratio, the braking torque desired by the driver is again evaluated and, in accordance with the evaluation result, the transmission gear ratio is, if appropriate, again adjusted in view of the desired braking torque. A drive train control system is also provided.

9 Claims, 5 Drawing Sheets

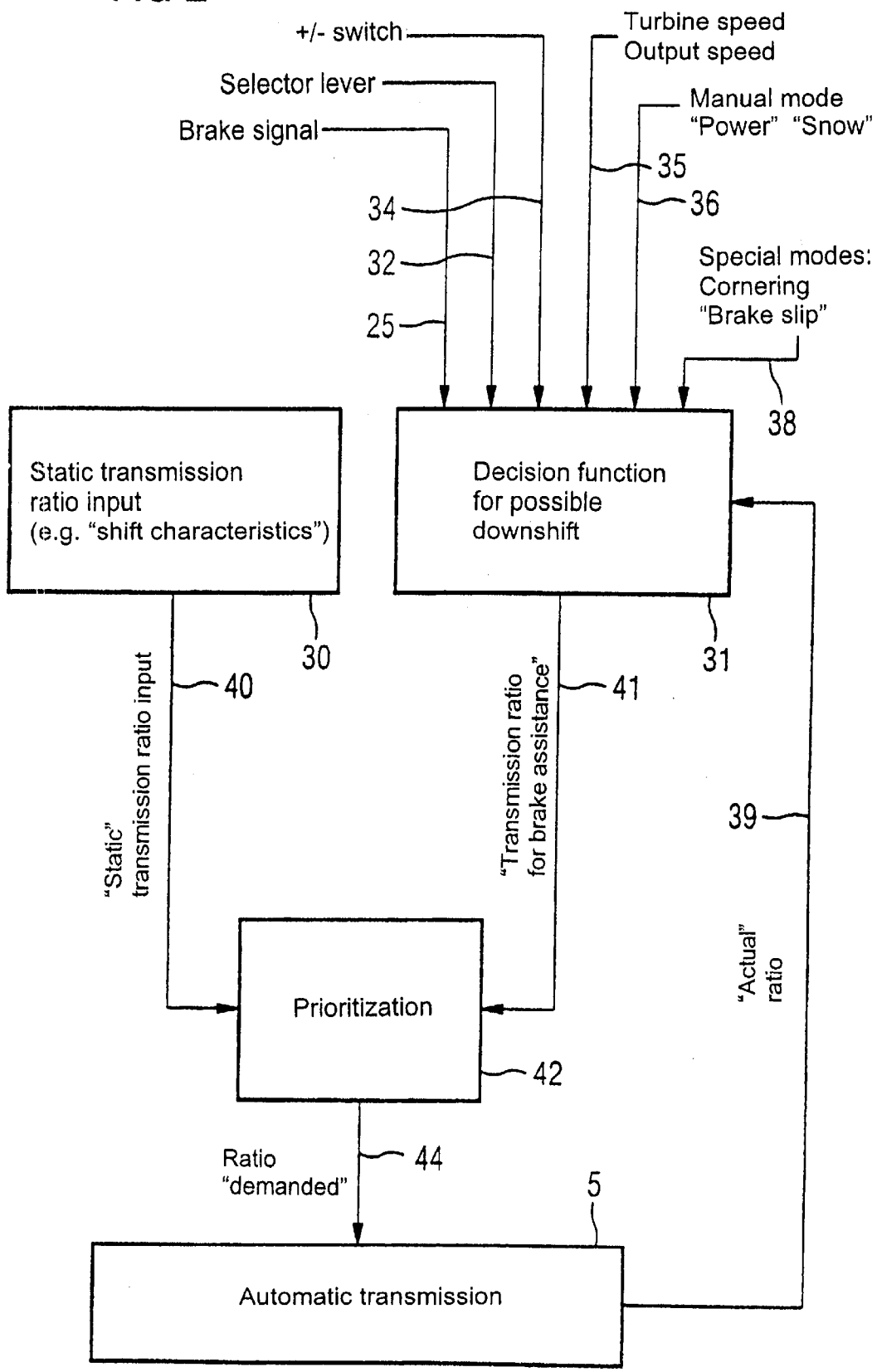

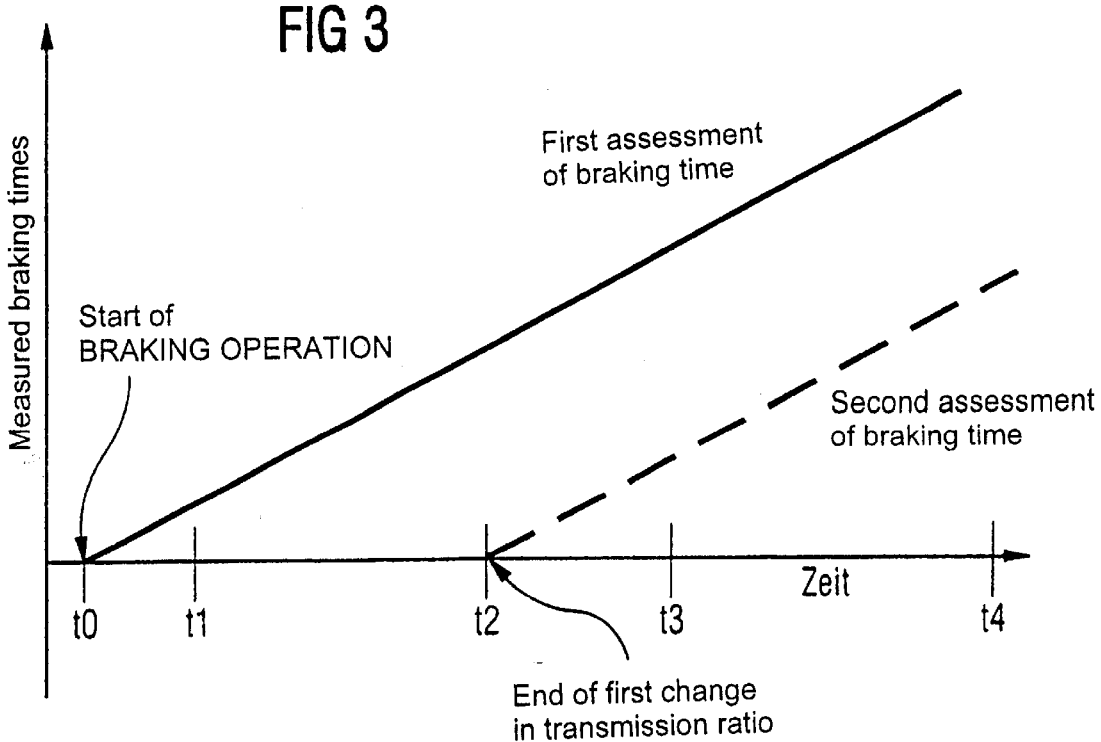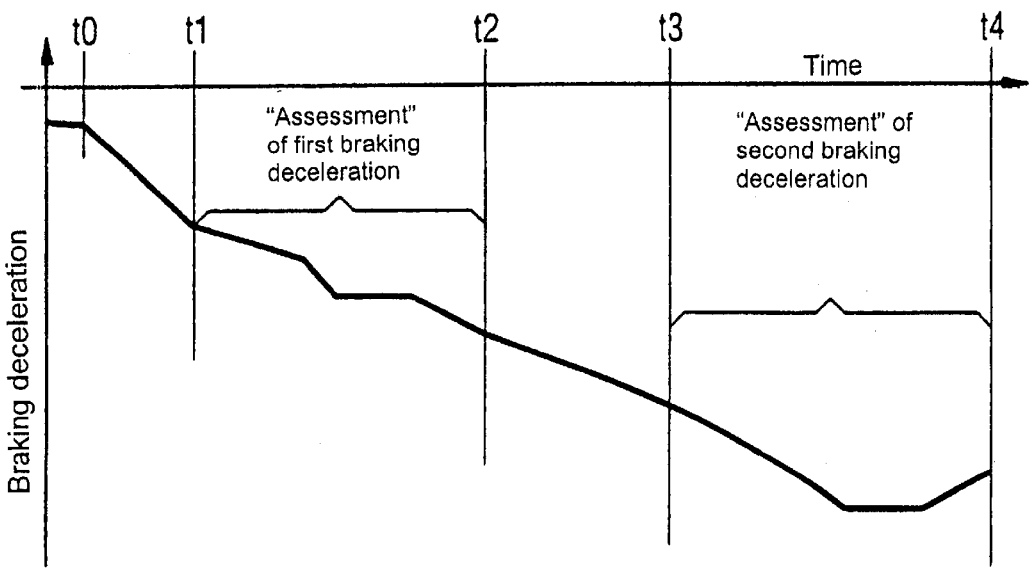

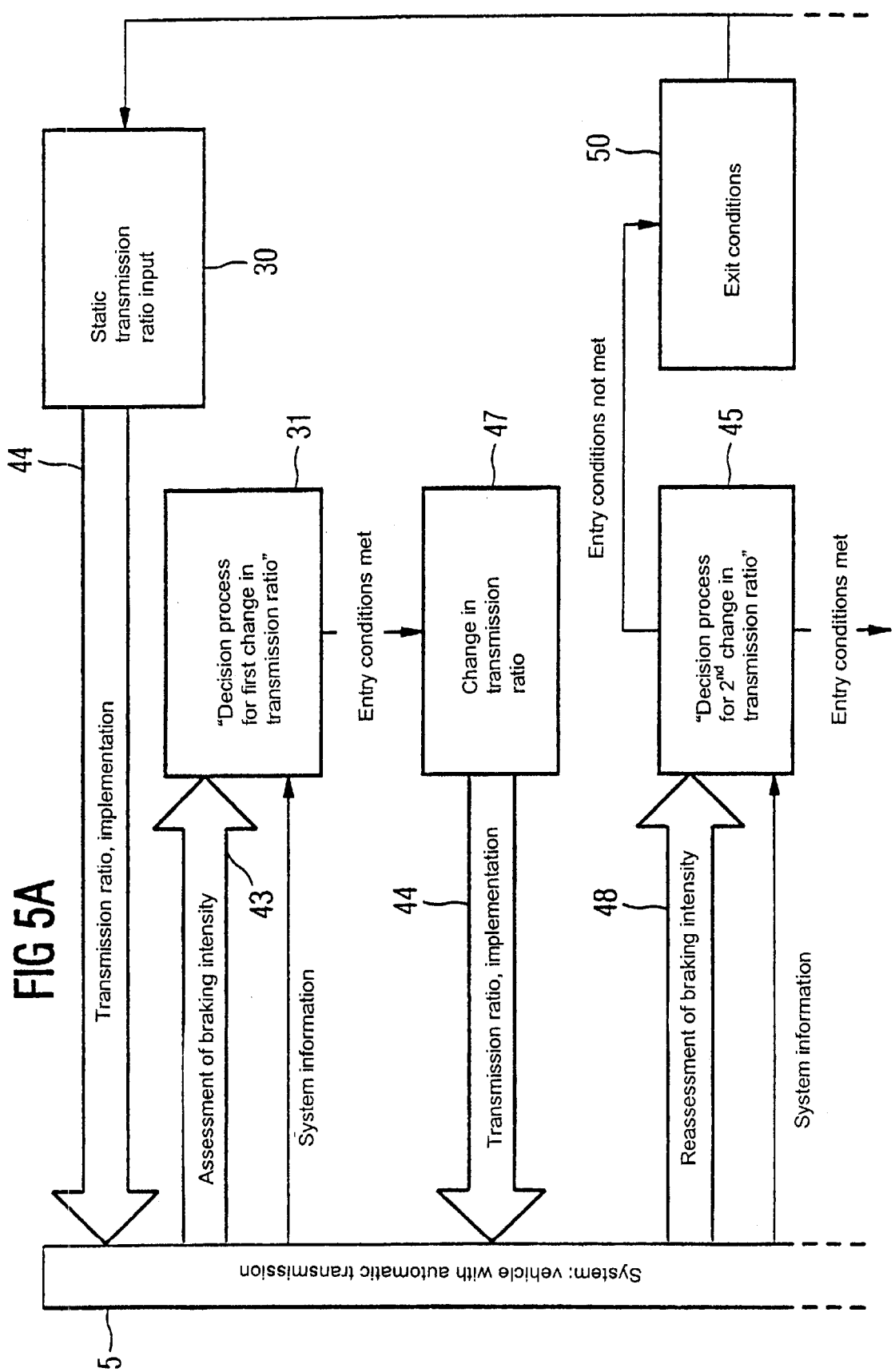

METHOD AND SYSTEM FOR CONTROLLING A DRIVE TRAIN OF A MOTOR VEHICLE

CROSS-REFERENCE TO RELATED APPLICATION

This application is a continuation of copending International Application No. PCT/DE98/01832, filed Jul. 2, 1998, which designated the United States.

BACKGROUND OF THE INVENTION

FIELD OF THE INVENTION

The invention relates to a method for controlling a drive train of a motor vehicle and to a drive train control system.

In conventional transmission control systems for motor vehicles, the transmission ratio of the transmission is set automatically as a function of the position of the accelerator pedal and of the speed of travel by using stored maps. Instead of using the position of the accelerator pedal as such, it is also possible to use a signal of a so-called electronic accelerator pedal (E-Gas for short) or some other variable derived from the engine torque demanded by the driver. In this case, various driving parameters and operating states of the motor vehicle are taken into account as is described in International Publication WO 97/01051. The respective gear to be selected or—in the case of continuously variable transmissions—the transmission ratio to be set is selected by control circuits operating by fuzzy logic methods. This logic describes expert knowledge gained from experience in the form of what is referred to as a basic set of rules. These rules are then used for regulating operations or control operations of the motor-vehicle transmission. The fuzzy logic circuit produces control signals, which, among other things, define the transmission ratio of the transmission and, in the case of automatic step-change transmissions, the gear to be selected.

Published, Non-Prosecuted German Patent Application DE 196 37 210 A1 discloses a conventional integrated drive train control system for a motor vehicle. The drive train control system interprets the position of the accelerator pedal and of the brake pedal as a wheel torque desired by the driver. It has a calculating device which receives the positions of the accelerator pedal and the brake pedal and which produces central control parameters for the drive unit and for those units of the drive train that exert a decelerating effect.

There are driving situations in which it would be expedient if actuation of the brakes by the driver were assisted by the drive train of the motor vehicle, when traveling downhill for example. This can, for example, be accomplished by the suppression of upshifts specified by a map, i.e. by retaining the existing transmission ratio.

European Patent Application EP 0 531 154 A2 discloses a transmission control system, with which the transmission ratio, which is determined as a function of the position of the accelerator pedal and of the speed of travel by using stored maps, can be corrected. For this purpose, a correction factor is determined by a fuzzy unit as a function of the driver's desire for braking, of the tractive resistance and of the current transmission ratio, and is added to the corresponding map value.

SUMMARY OF THE INVENTION

It is accordingly an object of the invention to provide a method for controlling a drive train of a motor vehicle and a drive train control system which overcome the above-mentioned disadvantages of the heretofore-known methods and systems of this general type and which detect a driver's desire or intention for braking and which assist the desired braking action sensitively and in an effective manner by controlling the transmission ratio of the automatic transmission.

With the foregoing and other objects in view there is provided, in accordance with the invention, a method for controlling a drive train of a motor vehicle, the method including the steps of:

automatically setting, by using stored maps, a transmission ratio of an automatic transmission at least as a function of a speed of a motor vehicle and as a function of one of a position of an accelerator pedal and a substitute variable for the position of the accelerator pedal;

evaluating, with a fuzzy logic circuit, signals characterizing a driving state of the motor vehicle and subsequently producing, with the fuzzy logic circuit, control signals for setting the transmission ratio;

assessing, with the fuzzy logic circuit, a braking torque desire of a driver of the motor vehicle only after a brake pedal has been actuated for a given period of time and controlling the transmission ratio for assisting a braking torque of a brake system, for example by changing or maintaining a transmission ratio; and assessing, with the fuzzy logic circuit, the braking torque desire of the driver again after changing the transmission ratio, and, if appropriate, adapting the transmission ratio again to the braking torque desire in accordance with an assessment result.

The invention has in particular the advantage that it requires only little additional expenditure or outlay. The basic circuit components and sensor signals required are already available in the control system known for example from the above-mentioned patent applications.

Moreover, no additional sensors are required. Essentially only a few different or additional fuzzy algorithms are required. Adaptation to the driver's desire or intention for braking can be carried out very sensitively since it takes place in several stages if required. Once the driver's desire for braking has been evaluated and the transmission ratio has been changed accordingly, the driver's desire for braking is in each case reassessed if the brake is still being activated, and the transmission ratio is adapted if necessary, and so forth.

According to another mode of the invention, after adapting the transmission ratio, the braking torque desire of the driver again is assessed again and the transmission ratio is changed in steps until a demanded braking torque is achieved.

According to yet another mode of the invention, the transmission ratio for assisting the braking torque is determined with the fuzzy logic circuit in parallel with a map-based calculation of the transmission ratio, and a change in the transmission ratio is calculated, with the fuzzy logic circuit, by using an actual transmission ratio present in the automatic transmission.

According to a further mode of the invention, the transmission ratio for assisting the braking torque is determined with the fuzzy logic circuit in parallel with a map-based calculation of the transmission ratio, and the transmission ratio is set to a statically determined transmission ratio if the statically determined transmission ratio results in an increase of the transmission ratio.

According to yet a further mode of the invention, driving state variables of the motor vehicle are derived, and the fuzzy logic circuit calculates the braking torque desire of the driver from the driving state variables.

According to another mode of the invention, a control signal is generated with the fuzzy logic circuit, the control signal is used as a rotational speed threshold for a comparison with a rotational speed of a turbine of the automatic transmission, and a change in the transmission ratio for assisting the brake torque is induced, if the rotational speed of the turbine falls below the rotational speed threshold.

According to yet another mode of the invention, a control signal is generated with the fuzzy logic circuit, the control signal is used as a rotational speed threshold for a comparison with an output rotational speed of the automatic transmission, and a change in the transmission ratio is induced for assisting the brake torque, if the output rotational speed of the automatic transmission falls below the rotational speed threshold.

According to a further mode of the invention, the transmission ratio for assisting the braking torque is maintained until given exit conditions are met.

With the objects of the invention in view there is also provided, a drive train control system, including:

a drive train controller for setting, based on stored map data, a transmission ratio as a function of at least a motor vehicle speed and as a function of one of an accelerator pedal position and a substitute variable for the accelerator pedal position;

the drive train controller including a fuzzy logic circuit, a signal line connecting the fuzzy logic circuit to a brake system;

the fuzzy logic circuit evaluating vehicle driving state signals and vehicle load signals for generating control signals for setting the transmission ratio; and the fuzzy logic circuit evaluating a braking torque desire of a driver, the braking torque desire being communicated by the brake system, and the fuzzy logic circuit controlling the transmission ratio, for example by changing or maintaining the transmission ratio, in order to assist a braking action of the brake system once a brake pedal has been actuated for a given period of time.

Other features which are considered as characteristic for the invention are set forth in the appended claims.

Although the invention is illustrated and described herein as embodied in a method and system for controlling the drive train of a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 2 is a structogram illustrating the method according to the invention;

FIG. 3 is a graph illustrating a temporal course of measured braking times;

FIG. 4 is a graph illustrating a temporal course of braking decelerations of the motor vehicle; and FIGS. 5a and 5b are a flow diagram of the program executed in the case of the method according to the invention.

DESCRIPTION OF THE PREFERRED EMBODIMENTS

Figure 1:
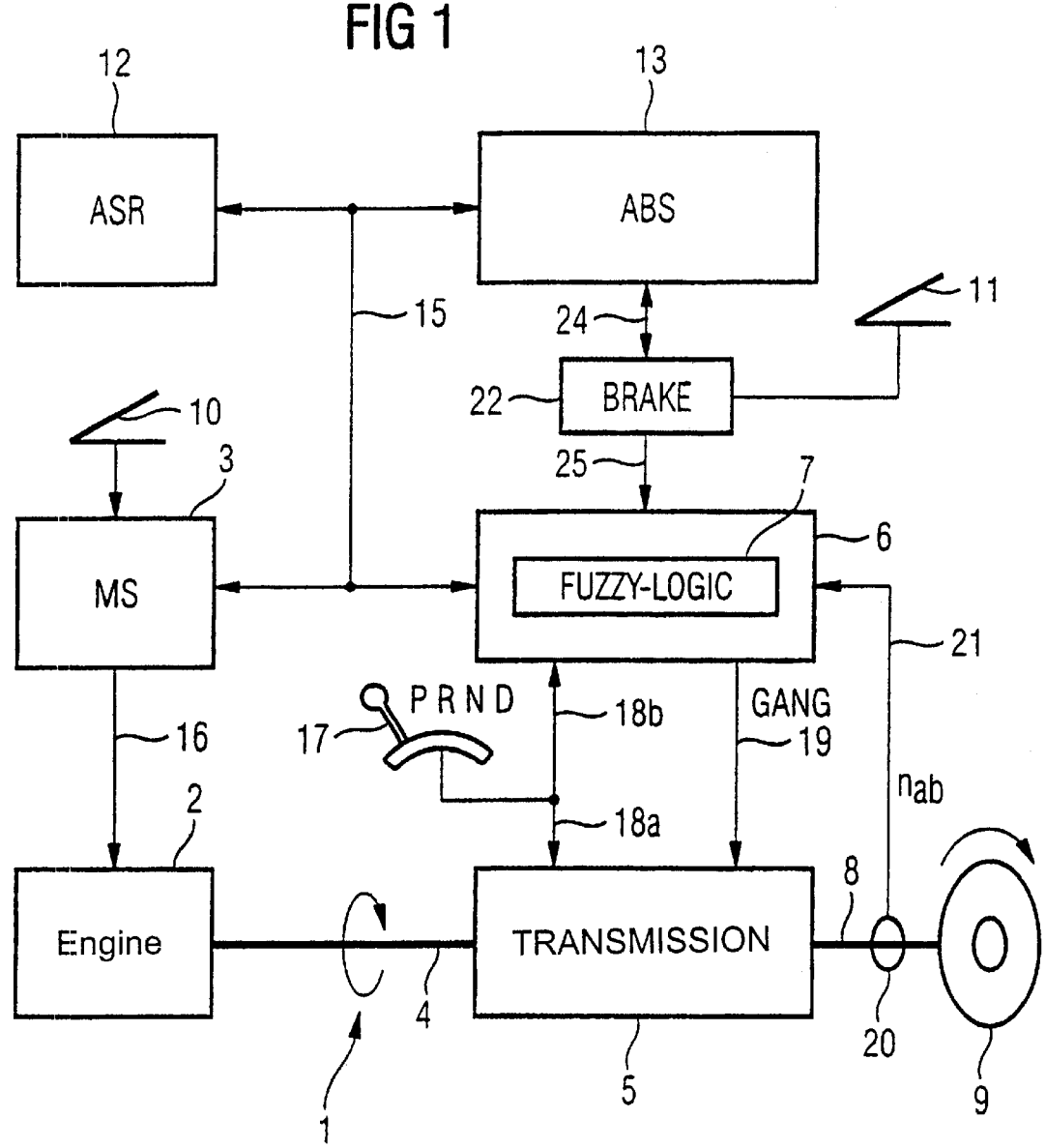
FIG. 1 is a block diagram of a motor vehicle controlled in accordance with the method according to the invention and provided with a drive train control system according to the invention.

Referring now to the figures of the drawings in detail and first, particularly, to FIG. 1 thereof, there is shown a schematically illustrated motor vehicle 1 which has an engine 2, which is controlled by an engine control system 3. An engine output shaft 4 is connected through the use of a torque converter or hydrodynamic coupling to an automatic transmission 5, which is controlled by an electronic drive train or transmission control system 6 according to the invention—also referred to below simply as a control system. In the exemplary embodiment, the transmission 5 is embodied as a step-change transmission or multi-step transmission, but a control system 6 according to the invention could equally well be used for a continuously variable transmission or to control the other devices in a motor vehicle. A control system of this kind may for example be used in a motor vehicle to control not only an automatic transmission but also a rear-wheel steering system, a traction control system or a cruise control system. The crucial component of the control system 6 is a fuzzy logic circuit 7. A transmission output shaft 8 is connected to the driven wheels of the motor vehicle, here symbolized by a driven wheel 9.

The driver of the motor vehicle communicates his or her commands or, more precisely, his or her intentions to the engine control system 3 through the use of an accelerator pedal 10.

When a brake pedal 11 is actuated, the brakes of the motor vehicle, which are here indicated schematically by a brake system 22, are actuated. The motor vehicle is furthermore provided with a wheel-slip or traction control system (ASR) 12 and an anti-lock brake system (ABS) 13, which are connected by signal lines or a bus 15 to one another and to the engine control system 3 and transmission control system 6 for the purpose of exchanging signals. Via a signal line 16, the engine control system 3 sends the engine 2 signals that control the ignition, the injection and the throttle valve (the latter only if there is a corresponding control device).

The driver determines the drive range of the automatic transmission 5 in the customary manner through the use of a selector lever 17. The selector-lever signals are transmitted via a mechanical connection 18a to the transmission 5 and via an electric signal line 18b to the control system 6. Via a signal line 19, the control system 6 sends control signals to the transmission 5, defining the respective transmission gear and controlling the required shift operations or—in the case of a continuously variable transmission—the respective transmission ratio.

The speed $n_{ab}$ of the transmission output shaft 8 is transmitted to the control system 6 by a speed sensor 20 via a signal line 21. At least the signal lines 15 that connect the control units 3, 6, 12 and 13 to one another can include individual signal lines or a bidirectional bus, e.g. a known CAN (Control Area Network) or LAN (Local Area Network) bus. The control units and systems 3, 12 and 13 need not be present. If they are, however, it is advantageous if the transmission control system 6 has access to the sensor signals (e.g. for the wheel speeds) supplied by them and to variables derived therefrom.

The brakes 22 are also controlled by the ABS system 13 when the latter is active. They are connected to it by a bidirectional signal line 24, via which control and state signals are transmitted. The operating state of the brakes 22 and hence also the desire or the intention for braking on the part of the driver, as expressed by actuation of the brake pedal 11, are communicated via another signal line 25 to the control system 6 and the fuzzy logic circuit 7. As already described, for example in International Publication WO 97/01051, membership functions are processed in the fuzzy logic circuit.

As is known, the drive train of the motor vehicle including the engine 2, the automatic transmission 5 and a number of other components, which are not explicitly shown here since they are known per se and are not essential to the invention, such as the hydrodynamic coupling and one or more differentials, is controlled in such a way that the transmission ratio of the automatic transmission is defined automatically as a function at least of the position of the accelerator pedal 10 and the speed of the motor vehicle using maps stored in the transmission control system 6. The fuzzy logic circuit 7 evaluates various signals characterizing driving states and the load state of the motor vehicle and then produces control signals that define the transmission ratio.

According to the invention, the fuzzy logic circuit 7 assesses or analyzes a desire for braking torque or vehicle deceleration on the part of the driver of the motor vehicle—expressed through actuation of the brake pedal 11—and implements a change in the transmission ratio that assists the braking action of the brake system 22. After changing the transmission ratio, the fuzzy logic circuit 7 reassesses the driver's desired braking torque and, if appropriate, adapts the transmission ratio to the desire for braking torque on the part of the driver again in accordance with the result of the assessment by once again changing the transmission ratio. This is repeated until the desired braking effect has been achieved.

The above-mentioned method for controlling the drive train of a motor vehicle and the mode of operation of the associated control system will now be explained in detail with reference to FIGS. 2 to 5. A block or stage 30 (FIG. 2) represents the "static transmission ratio input", i.e. the customary setting or definition of the transmission ratio of the transmission 5 by shift characteristics stored in one or more shift maps or map memories of the control system 6.

A block or stage 31 represents the "decision function for a possible downshift", which forms the heart of the invention. This block receives the brake signal representing the desire for braking torque via a (signal) line 25, the signals from the selector lever 17 via a line 32, and, via a line 34, the signals from a ± switch, through the use of which the driver can increase or reduce the transmission ratio by one step in each case. Via a line 35, the block 31 receives sensor signals representing the turbine speed or output speed of the transmission 5. Via a line 36, it receives signals through the use of which the driver can manually select special shift maps, e.g. a power-oriented map in a "power" mode, and a map provided for the purpose of careful driving in wintry road conditions in a "snow" mode.

Via a line 38, the block 31 receives signals that characterize special driving states, indicating for example that the motor vehicle is traveling around a bend or that brake slip is occurring, this being signaled by the ABS system 13. Via a signal line 39, it receives from the automatic transmission 5 the actual transmission ratio of the latter.

Block 30 is connected by a line 40 and block 31 by a line 41 to a block or prioritization stage 42, in which prioritization or a selection function is performed. The static transmission ratio input, i.e. the definition of the transmission ratio through the use of maps and the "dynamic" decision function according to the invention, through the use of which the transmission ratio is defined to match the desire for braking torque on the part of the driver, take place in parallel. In the case of the decision function, the statically specified gear (or transmission ratio) is not used as the output variable or reference; instead, each new gear stage is determined on the basis of the actual transmission ratio physically present (selected) in the automatic transmission 5. If the static gear input by block 30 and the transmission ratio selection proposed in block 31 for the purpose of increasing the braking power give different values for the transmission ratio, prioritization or selection is performed in block 42 to select a resultant transmission ratio as a function of predetermined conditions and transmit it via a line 44 to the automatic transmission 5, in particular to a shift sequence control system contained in the latter.

If the map-based or static gear calculation results in a larger transmission ratio—corresponding to a lower gear—, this larger transmission ratio is set in the transmission 5. This means that, in this case, the statically calculated transmission ratio is prioritized. To activate a change in the transmission ratio that is not map-based, predetermined input conditions must be met. Predetermined conditions or requirements must likewise be met for deactivation of such a change in the transmission ratio.

The driver's desire for a given braking torque is determined either from directly measured variables of the brake system 22 or from derived system variables. One example of a directly measured system variable is the brake pressure produced by the driver. If there are suitable sensors at the brake pedal, it is also possible to use the rate of displacement and the position of the brake pedal 11 as measured variables for detecting or calculating the intensity of braking.

Assessment and calculation of a desire for braking torque on the part of the driver takes place only once a predetermined period of time has elapsed since the beginning of the braking operation. If the braking operation begins at time t0 (FIG. 3 and FIG. 4), assessment of an initial braking deceleration begins at a time t1. At a time t2, the first change in the transmission ratio is complete. If the brake continues to be actuated, measurement of a second braking time begins at this time. Here too, the corresponding second assessment of the braking deceleration begins only after a predetermined period of time t3–t2 and ends at a time t4. If the brake continues to be actuated after time t4, an additional third assessment of the braking deceleration takes place after the expiry of a predetermined time period. As already mentioned, this process continues until the required braking assistance has been achieved with the automatic transmission 5.

Braking activity is only assessed, that is to say the braking time and intensity of braking are determined only at times when the driver is actuating the brake system 22, i.e. the assessment variables (e.g. the braking time) are reset to zero or to their initial value. Also, when the brake is released, a time period may be provided before the braking operation is regarded as complete.

Figure 5B:
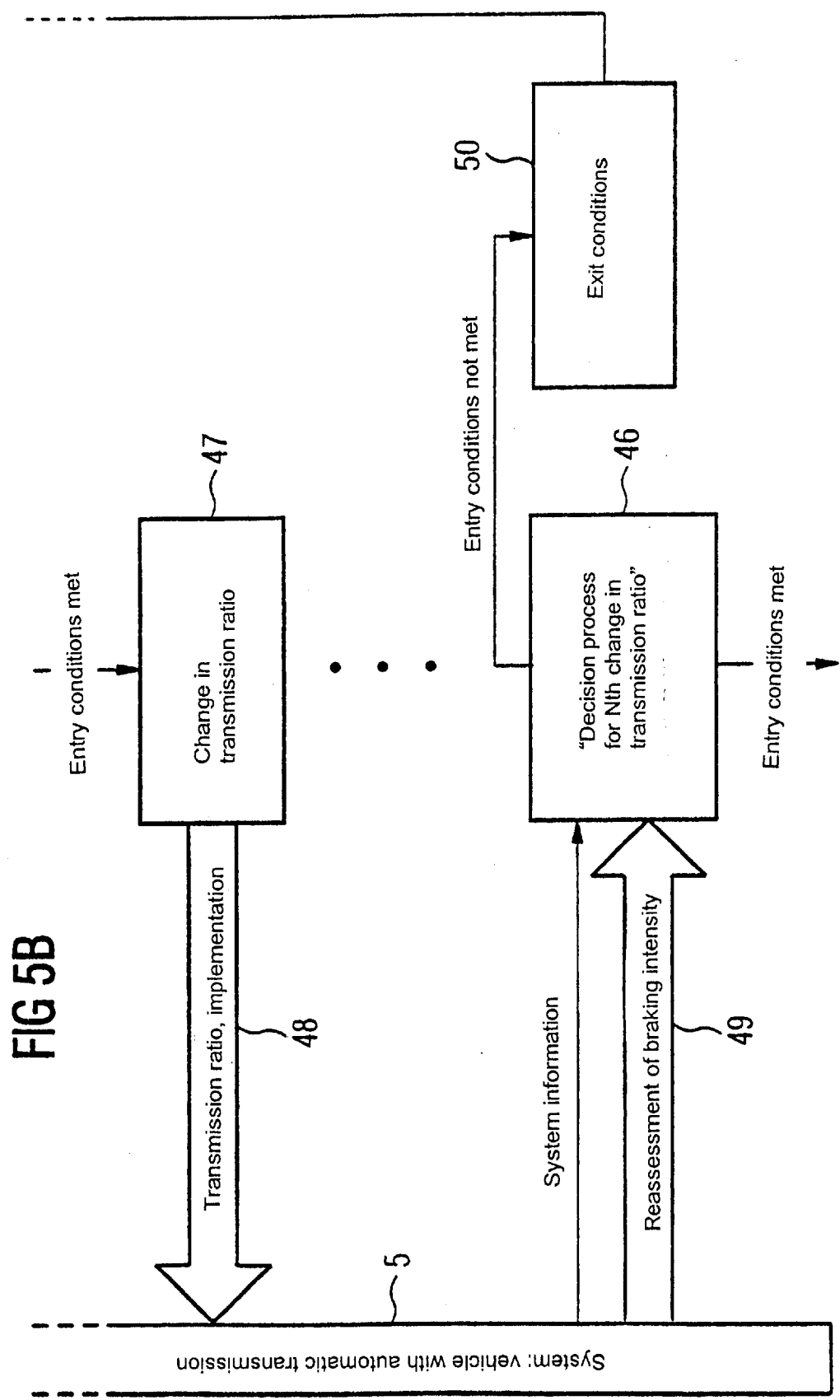

A number of decision blocks or stages are shown in the flow diagram in FIGS. 5a, 5b, namely a first decision stage 31, a second decision stage 45 and an $N^{th}$ decision stage 46. The assessment and calculation algorithms performed by the fuzzy logic circuit 7 in these decision stages are the same.

However, the variables processed for the purpose of determining the desired intensity of braking in each individual decision stage in which a decision is in each case taken on a subsequent change in the transmission ratio to assist braking are independent. That is to say, each change in the transmission ratio to assist braking is followed by reassessment of the braking activity with independent values for the braking intensity. These reassessments are represented by respective arrows 43, 48 and 49 indicating a data transfer. If it is found in the decision block 45 for the second change in the transmission ratio that the entry conditions for a (further) change in the transmission ratio to assist braking have not been met, the exit conditions are checked in a block 50. If they are present, the program returns to block 30 and thus to a definition or setting of the transmission ratio on the basis of maps.

In the case of the flow diagram in FIGS. 5a, 5b, the prioritization block 42 is not shown to avoid cluttering the drawing. The static transmission ratio input (static transmission ratio setting) 30 and the blocks or stages 47 for a change in the transmission ratio, which carry out the respectively decided change in the transmission ratio, are connected directly to the automatic transmission 5 by the lines 44.

The decision on a possible change in the transmission ratio additionally takes account of a driver classification and the load state of the motor vehicle, which have been determined by the fuzzy logic circuit 7 in a known manner. The driver classification can be performed indirectly through the use of a selected driver program or directly through the use of a characteristic quantity that characterizes the driver ("driver value"). The load state can be determined through the use of a calculated and derived load value or through the use of a variable (e.g. a differential torque) that characterizes the load state.

The state variables are all processed in the fuzzy logic circuit 7, which, for its part, produces a control signal that brings about the change in the transmission ratio. To produce this control signal, it is also possible to use a number of fuzzy systems of different configuration. The relevant system is then selected as a function of the respectively selected adapted driving program. It is also possible to use fuzzy systems selected as a function of the manually specified driving program (for sporty or winter driving).

The control signal produced by the fuzzy logic circuit 7 is used as a speed threshold for the turbine speed of the automatic transmission 5 and is compared to it. If the turbine speed is below the value of the control signal, a proposal to change the transmission ratio is transmitted from block 31 to the prioritization stage 42. Instead of the turbine speed, it is also possible to use the transmission output speed for this comparison.

If the transmission control system 6 detects system faults that are critical in terms of safety, e.g. the failure of a speed sensor signal, which do not allow a clear decision on a change in the transmission ratio, the change in the transmission ratio is not carried out. The static transmission ratio input according to a map is prioritized.

In certain driving states that are critical in terms of safety, e.g. cornering, occurrence of brake slip, slippery road surface etc., changes in the transmission ratio that are demanded for the purpose of assisting braking are suppressed. Manual intervention by the driver via the selector lever 17 or a manual gear input through the use of a button 34 ("Tiptronik" function) are interpreted as directly intended by the driver and are therefore given higher priority. It is thereby possible to suppress a change demanded in the transmission ratio or to reverse a change in the transmission ratio that has already been carried out.

If a change in the transmission ratio to assist braking has been carried out, the following alternatives are possible:
  Holding the active transmission ratio,
  Changing the transmission ratio to the static value specified by the map,
  Changing the transmission ratio to continue brake assistance.

A further change in the transmission ratio in the direction of a higher ratio (corresponds to another downshift) takes place if the entry conditions are met once again upon reassessment of the braking deceleration.

The active transmission ratio is maintained until the exit conditions are met. Before the exit conditions can be checked, the entry conditions must no longer be met. This can be accomplished, for example, by the control signal produced by the fuzzy logic circuit 7 being exceeded by the turbine speed or when the braking operation is ended.

If the entry conditions are no longer met, checking of the exit conditions thus takes place. For this purpose, the acceleration state of the motor vehicle is used as an input variable. Depending on the respective acceleration level (in the case of positive acceleration), the following alternatives are available:
  Small positive or negative acceleration level→the transmission ratio is maintained.
  Medium positive acceleration level→the vehicle must maintain this acceleration level for a predetermined distance or for a defined period of time, after which the transmission ratio is released, i.e. a statically determined transmission ratio or one determined on the basis of a map is adopted.
  Large positive acceleration level→the transmission ratio is released, i.e. the static transmission ratio is adopted.

When the set transmission ratio is departed from, additional operating states are taken into account, e.g. a "fast-off" state, in which the accelerator pedal is suddenly released. This means that a smaller transmission ratio is not set in the case of an "unstable" accelerator pedal. An unstable accelerator pedal of this kind is present, for example, when the driver is playing with the accelerator pedal.

I claim:

1. A method for controlling a drive train of a motor vehicle, comprising:
   automatically setting, by using stored maps, a transmission ratio of an automatic transmission at least as a function of a speed of a motor vehicle and as a function of one of a position of an accelerator pedal and a substitute variable for the position of the accelerator pedal;
   evaluating, with a fuzzy logic circuit, signals characterizing a driving state of the motor vehicle and subsequently producing, with the fuzzy logic circuit, control signals for setting the transmission ratio;
   assessing, with the fuzzy logic circuit, a braking torque desire of a driver of the motor vehicle only after a brake pedal has been actuated for a given period of time and changing the transmission ratio for assisting a braking torque of a brake system; and
   assessing, with the fuzzy logic circuit, the braking torque desire of the driver again after changing the transmission ratio, and, if appropriate, adapting the transmission ratio again to the braking torque desire in accordance with an assessment result.

2. The method according to claim 1, which comprises, after adapting the transmission ratio again, assessing, with the fuzzy logic circuit, the braking torque desire of the driver again and changing the transmission ratio in steps until a demanded braking torque is achieved.

3. The method according to claim 1, which comprises:
determining the transmission ratio for assisting the braking torque with the fuzzy logic circuit in parallel with a map-based calculation of the transmission ratio; and
calculating, with the fuzzy logic circuit, a change in the transmission ratio by using an actual transmission ratio present in the automatic transmission.

4. The method according to claim 1, which comprises:
determining the transmission ratio for assisting the braking torque with the fuzzy logic circuit in parallel with a map-based calculation of the transmission ratio; and
setting, with the fuzzy logic circuit, the transmission ratio to a statically determined transmission ratio if the statically determined transmission ratio results in an increase of the transmission ratio.

5. The method according to claim 1, which comprises:
deriving driving state variables of the motor vehicle; and
calculating, with the fuzzy logic circuit, the braking torque desire of the driver from the driving state variables.

6. The method according to claim 1, which comprises:
generating a control signal with the fuzzy logic circuit;
using the control signal as a rotational speed threshold for a comparison with a rotational speed of a turbine of the automatic transmission; and
inducing a change in the transmission ratio for assisting the brake torque, if the rotational speed of the turbine falls below the rotational speed threshold.

7. The method according to claim 1, which comprises:
generating a control signal with the fuzzy logic circuit;
using the control signal as a rotational speed threshold for a comparison with an output rotational speed of the automatic transmission; and
inducing a change in the transmission ratio for assisting the brake torque, if the output rotational speed of the automatic transmission falls below the rotational speed threshold.

8. The method according to claim 1, which comprises maintaining the transmission ratio for assisting the braking torque until given exit conditions are met.

9. In combination with a brake system having a break pedal, a drive train control system for a motor vehicle, comprising:
a drive train controller for setting, based on stored map data, a transmission ratio as a function of at least a motor vehicle speed and as a function of one of an accelerator pedal position and a substitute variable for the accelerator pedal position;
said drive train controller including a fuzzy logic circuit,
a signal line connecting said fuzzy logic circuit to the brake system;
said fuzzy logic circuit evaluating vehicle driving state signals and vehicle load signals for generating control signals for setting the transmission ratio; and
said fuzzy logic circuit evaluating a braking torque desire of a driver, the braking torque desire being communicated by the brake system, and said fuzzy logic circuit performing a change in the transmission ratio for assisting a braking action of the brake system once the brake pedal has been actuated for a given period of time.

* * * * *